(12) United States Patent
Rosel

(10) Patent No.: US 7,542,603 B2
(45) Date of Patent: Jun. 2, 2009

(54) PROCESS FOR DRAFTING A CURVE IN A COMPUTER-AIDED DESIGN SYSTEM

(75) Inventor: Sebastien Rosel, Gif sur Yvette (FR)

(73) Assignee: Dassault Systemes (FR)

( * ) Notice: Subject to any disclaimer, the term of this patent is extended or adjusted under 35 U.S.C. 154(b) by 913 days.

(21) Appl. No.: 11/049,196

(22) Filed: Feb. 2, 2005

(65) Prior Publication Data

US 2005/0175238 A1     Aug. 11, 2005

(30) Foreign Application Priority Data

Feb. 6, 2004   (EP) ................... 04290321

(51) Int. Cl.
*G06K 9/00*   (2006.01)
*G06F 15/00*  (2006.01)
*G06T 17/00*  (2006.01)

(52) U.S. Cl. ................... 382/173; 345/442
(58) Field of Classification Search ............ 382/164, 382/173, 181, 193, 197, 199, 202, 204, 230; 345/419, 424, 442, 611; 396/556
See application file for complete search history.

(56) References Cited

U.S. PATENT DOCUMENTS

| | | | | |
|---|---|---|---|---|
| 4,620,287 A |   | 10/1986 | Yam ............................ 345/442 |
| 5,317,682 A | * | 5/1994  | Luken, Jr. .................... 345/442 |
| 5,566,292 A | * | 10/1996 | Krembs ........................ 345/442 |
| 5,694,536 A | * | 12/1997 | Gangnet et al. .............. 345/442 |
| 5,940,083 A |   | 8/1999  | Broekhuijsen ............... 245/442 |
| 6,111,588 A | * | 8/2000  | Newell ......................... 345/442 |
| 6,256,039 B1 | * | 7/2001 | Krishnamurthy ............. 345/420 |
| 6,259,802 B1 | * | 7/2001 | Jolly et al. .................... 382/103 |
| 6,373,490 B1 | * | 4/2002 | Bendiksen et al. ........... 345/441 |
| 6,628,285 B1 | * | 9/2003 | Abeyta et al. ................ 345/441 |
| 6,973,212 B2 | * | 12/2005 | Boykov et al. .............. 382/173 |
| 2005/0175238 A1 | * | 8/2005 | Rosel ........................ 382/173 |

FOREIGN PATENT DOCUMENTS

EP          1274045         1/2003
WO       WO 95/32485       5/1995

OTHER PUBLICATIONS

European Search Report and Communication for EP 04290321 dated Jul. 5, 2004.
Sheng-Feng Qin et al., "On-Line Segmentation of Freehand Sketches by Knowledge-Based Nonlinear Thresholding Operations," Pattern Recognition, vol. 34., No. 10, Oct. 2001.

(Continued)

*Primary Examiner*—Amir Alavi
(74) *Attorney, Agent, or Firm*—Isabel Cantallops; Clifford Chance US LLP

(57) ABSTRACT

A curve is created in a computer-aided design system, based on a set of points inputted by the user. A polyline is computed and the curvature envelope along said polyline is computed to determine particular points ($A_0, A_1, A_2, A_3, A_4, A_5$) on thepolyline, which are extrema of curvature. Segmenting points ($M_{0,1}, M_{1,2}, M_{2,3}, M_{3,4}, M_{4,5}$) are selected between pairs of particular points. A curve passing through the particular segmenting points is computed and is fitted to thepolyline.

The process provides a curve that is well fitted to the set of points and does not require high skills from the user.

23 Claims, 4 Drawing Sheets

OTHER PUBLICATIONS

Thomas Baudel, "A Mark-Based Interaction Paradigm for Free-Hand Drawing," Symposium on User Interface Software and Technology, pp. 185-192, Nov. 2, 1994.

Marc Berthod et al., "Le Pretraitement des Traces Manuscrits sur une Tablette Graphique," Reconnaissance des formes et Intelligence Artificielle, vol. 3, Sep. 1979.

* cited by examiner

PROCESS FOR DRAFTING A CURVE IN A COMPUTER-AIDED DESIGN SYSTEM

CROSS REFERENCE TO RELATED APPLICATIONS

This application claims priority to European patent application no. 04290321.1 filed Feb. 6, 2004, which is currently pending.

FIELD OF THE INVENTION

The invention relates to the field of computers programs and systems, and more specifically to part design programs and systems.

BACKGROUND OF THE INVENTION

A number of systems and programs are offered on the market for the design of parts or assemblies of parts, such as the one provided by the applicant under the trademark CATIA. These so-called computer-aided design (CAD) systems allow a user to construct and manipulate complex three-dimensional (3D) models of parts or assembly of parts. A number of different modelling techniques can be used to create a model of an assembly. These techniques include solid modelling, wire-frame modelling, and surface modelling. Solid modelling techniques provide for topological 3D models, where the 3D model is a collection of interconnected edges and faces, for example. Geometrically, a 3D solid model is a collection of trimmed or relimited surfaces that defines a closed skin. The trimmed surfaces correspond to the topological faces bounded by the edges. The closed skin defines a bounded region of 3D space filled with the part's material. Wire-frame modelling techniques, on the other hand, can be used to represent a model as a collection of simple 3D lines, whereas surface modelling can be used to represent a model as a collection of exterior surfaces. CAD systems may combine these, and other, modelling techniques, such as parametric modelling techniques. CAD systems thus provide a representation of modelled objects using edges or lines, in certain cases with faces. The modelled objects comprise a number of lines or edges; these may be represented in various manners, e.g. non-uniform rational B-splines (nurbs), Bezier curves or other algorithms describing a curve. In the rest of this description, the word "curve" is use to describe mathematical curves, that is curves defined by parameters and possibly by a limited number of control points. The word "polylines" is used to describe a spatially ordered set of points in a design system; a polyline comprises all the points in the line or edge. For instance, consider the example of a segment extending from a point A to a point B: the curve is defined by points A and B and the fact that the curve is the part of the straight line passing through points A and B which is limited by these point. On the other hand, the polyline corresponding to the segment is comprised of points A and B and of all points of the segment from A to B. The polyline is ordered, in that the points are ordered from A to B or from B to A.

One feature of design systems is the ability for the user to create or modify curves, using haptic devices such as mouse, trackpads, graphics tablets or the like. Another feature is the ability for the user to connect adjacent curves. Notably, for curves in design systems and notably at points of connection between curves, there may exist constraints on position of the curve, derivatives or tangents, second derivatives or curvatures, or higher degree derivates.

Existing systems require from the user a high level of experience for drafting or modifying curves. For instance, in a prior art system such as AliasStudioTools™ from Alias®, ICEM Surf from ICEM or CATIA® from Dassault Systemes, a curve is defined based on a number of control points, selected by the user. The user may also associate constraints to the control points—such as a value of position, tangent, or curvature at the control point. Creating the curve requires that the user selects the various control points, and, if necessary, the associated constraints. Selecting control points requires a high level of experience from the user, since the resulting curve depends closely on the selection of the points; the dependence of the resulting curves on the control points also varies from one design system to the other. Furthermore, control points may not be located on the curve itself, making it extremely difficult to tune local modifications with the desired precision.

In addition, a curve may be segmented, that is formed of various curves connected at segmenting points. Segmenting a global curve also requires a high level of skill from the user, since a proper selection of segmenting points impacts the resulting global curve, especially if this global curve is later modified. In the rest of this description, for the sake of better understanding, the word "arc" will be used to a segment of a curve; in other words, a segmented curve is formed of several arcs. It should however be clear that such an "arc" is still is nonetheless a curve, the word "arc" being simply used for the sake of avoiding any confusion between a segmented curve and the various curves—or arcs—forming the segmented curve. The segmentation of a curve enables for example the description of local details. In existing design systems, the user may not be aware of the existence of segmenting points in a curve; for instance, in the case of a nurbs, the curve may be formed of various arcs, extending between segmenting points, each arc being represented by a Bezier curve. The user only sees the end points of the curve, but not the intermediate segmenting points.

For modifying an existing curve, the user acts on the control points or their associated constraints. For changing an existing curve, the user may however have to modify several of the control points or all control points, for achieving the required result. Any time the user changes a control point or an associated constraint, the design system computes again the curve.

These problems are exemplified in FIG. 1, in the case of an image created in Microsoft® Word. In this simple example, the control points are not associated with any value. The figure shows an ellipsis 2, which is defined by nine control points; this ellipsis is an example of a curve—which happens to be a closed curve. Control points 4, 6, 8 and 10 are located at the respective corners of a rectangle containing the ellipsis and the sides of which are respectively parallel to the major and minor axes of the ellipsis. Control points 4, 6, 8 and 10 may be used for sizing up and down the ellipsis, in a proportional transformation centred on the opposed control point. Control points 12, 14, 16 and 18 are located at the middles of the sides of the rectangle and are used for lengthening or shortening the ellipsis, in directions parallel to the sides of the rectangle. Last control point 20 is used for rotating the ellipsis, around a centre of rotation located substantially in the middle of the ellipsis. FIG. 1 further shows an amended ellipsis 22, the control points of the amended ellipsis being omitted for the sake of clarity. Changing ellipsis 2 into ellipsis 22 requires acting on at least three control points, for lengthening ellipsis 2, increasing the size of the lengthened ellipsis and then rotating the increased ellipsis. Selecting the control points for achieving a given result, even in this simple example, requires a full understanding of the operation of the control points.

The company ALIAS® offers, for example under the trademark MAYA 5 a design system, in which the user may draft a curve, using a graphics tablet. A curve is created for each stroke of the tablet's pencil, with associated control points. For modifying an existing curve, the user acts on the control points of the curve.

EP-A-1 274 045 discloses a method and system for real-time analysis and display of curve connection quality. The problem addressed in this application is the quality of curves. This application discusses the use of a "comb" representation of the second derivative of the curve, with respect to a curvilinear abscissa, which is also called curvature envelope. The curvature envelop is representative of the shape of a curve. In an orthogonal set of coordinates (x, y), the second derivative is a vector, the coordinates of which are $$\frac{\partial^2 x}{\partial s^2} \text{ and}$$
$$\frac{\partial^2 y}{\partial s^2}$$

where s is the curvilinear abscissa. The curvature C designates the norm of this vector. Of course, the definition generally applies to other types of coordinates, as well known to the person skilled in the art.

FIG. 2 shows an example of such a comb, for the second derivative of a curve 30—in other words the curvature of the curve 30. The value of the second derivative (equalling the acceleration) is computed along the curve; along the curve, one also computes the tangent vector and the normal vector. The normal vector is the vector product of tangent vector and of the acceleration vector:

$$\vec{n} = \vec{t} \wedge \vec{a}$$

Then, the vector product of the normal vector and the tangent vector is computed, giving the vector 32, having a length of 1 and which is orthogonal to the curve 30:

$$\vec{u} = \vec{n} \wedge \vec{t}$$

The "comb" 36 is represented on FIG. 2 as a number of vectors issued from points along the curve. FIG. 2 shows for point A the vector $\vec{u}$ 32 and the computed vector 34 which length is representative of the curvature at point A. In the simplest case (scale 1), vector 34 is the product of curvature C by the vector $\vec{u}$.

The curve 36—also called envelope—joining the end of the computed vectors 34 for all points of curve 30 is representative of the second derivative and provides the user with a graphical representation of the second derivative. For instance, envelope 36 intersects curve 30 at points where the value of the second derivative is zero and such intersections are representative of changes of curvature (sign of the second derivative) of curve 30. The example of FIG. 2 displays the second derivative, but a "comb" representation may also be used for higher degree derivatives; in application EP-A-1 274 045, the "comb" representation is used for assessing curve connection quality.

There exists a need for a solution allowing a user of a design system to draft and modify curves, without requiring high level of skills from the user. Ideally, the solution would be user-friendly and would also be easy to understand and implement for the user.

SUMMARY OF THE INVENTION

According to the invention, there is provided a computer-implemented process for creating a curve, comprising the steps of
  receiving a set of points and computing a polyline based on the received set of points;
  computing curvature along the polyline;
  determining particular points on the polyline, the particular points comprising extrema of curvature;
  determining at least one segmenting point on the polyline apart from the particular points;
  computing a curve passing through the segmenting points and
  fitting said curve to the polyline.

According to an embodiment, the particular points comprise points where the value of the curvature is zero and further comprise points limiting a portion of the polyline where the value of the curvature is constant.

According to an embodiment, the step of determining comprises selecting one segmenting point between two adjacent particular points.

According to a particular embodiment, the segmenting point is selected according to the relative value of
  the integral of the curvature along the polyline from one of said two adjacent particular points to the segmenting point and
  the integral of the curvature along the polyline from the segmenting point to the other one of said two adjacent particular points.

According to an embodiment, one of the two adjacent particular points is a point where the value of curvature is zero, and the segmenting point is selected so that
  the product of a first predetermined constant by the integral of the curvature along the curve from the other of said two adjacent particular points to the segmenting point equals
  the integral of the curvature along the curve from the segmenting point to the point where the value of curvature is zero.

For example, the value of said first predetermined constant is between 0.5 and 0.9.

According to another embodiment, the two adjacent particular points are a minimum and a maximum of curvature and the segmenting point is selected so that
  the product of a second predetermined constant by the integral of the curvature along the curve from the minimum of curvature to the segmenting point equals
  the integral of the curvature along the curve from the segmenting point to maximum of curvature. For example, the value of said second predetermined constant is between 0.1 and 0.5.

According to an embodiment, the step of fitting comprises minimizing the energy of the curve.

The invention also proposes a computer implemented process for amending a curve, comprising the steps of
  providing a curve;
  receiving a set of points and computing a polyline;
  computing a new polyline based on the curve and on the computed polyline;
  creating a curve based on the new polyline, according to the process of creation of the invention According to an embodiment, the step of computing a new polyline comprises retrieving a polyline associated to the curve;

merging the retrieved polyline and the computed polyline.

According to one embodiment, the step of retrieving a polyline associated to the curve comprises retrieving a stored polyline.

According to another embodiment, the step of retrieving a polyline associated to the curve comprises computing a polyline on the basis of the curve.

According to a particular embodiment, the step of receiving a set of points comprises receiving a template.

The invention further proposes a computer implemented process for creating a curve, comprising the steps of detecting a first stroke inputted by a user on a haptic device;

creating a curve based on a first set of points corresponding to said first stroke, according to the process of the invention;

detecting a second stroke inputted by the user on the haptic device;

computing a polyline based on the created curve and on a second set of points corresponding to said second stroke;

creating a curve based on the polyline, according to the process of creation of the invention.

If needed, the steps of detecting, computing and creating are repeated for each new stroke inputted by the user on the haptic device.

The invention also proposes a computer program for creating a curve, comprising a routine for receiving a set of points and computing a polyline based on the received set of points;

a routine for computing curvature along the polyline;

a routine for determining particular points on the polyline, the particular points comprising extrema of curvature;

a routine for determining at least one segmenting point on the polyline apart from the particular points;

a routine for computing a curve passing through the segmenting points and a routine for fitting said curve to the polyline.

The invention further provides a computer program for amending a curve, comprising a routing for providing a curve;

a routine for receiving a set of points and computing a polyline;

a routine for computing a new polyline based on the curve and on the computed polyline;

a routine for creating a curve based on the new polyline, using the program for creating a curve according to the invention.

The invention also proposes a computer program for creating a curve, comprising a routine for detecting a first stroke inputted by a user on a haptic device;

a routine for creating a curve based on a first set of points corresponding to said first stroke, using the program process of the invention;

a routine for detecting a second stroke inputted by the user on the haptic device;

a routine for computing a polyline based on the created curve and on a second set of points corresponding to said second stroke;

a routine for creating a curve based on the polyline, using the program of creation according to the invention.

A computer-aided design system embodying the invention will now be described, by way of non-limiting example, and in reference to the accompanying drawings.

DETAILED DESCRIPTION OF THE INVENTION

The invention makes it possible to create a curve, starting from a set of points created by the user of a design system. The set of points may be inputted by the user with any type of haptic device, e.g. a mouse, a trackpad, a graphics tablet or the like. Based on the set of points, a curve is created, as explained in reference to FIGS. 3-6. An existing curve may also be modified, as explained in reference to FIGS. 7-8.

Figure 3:
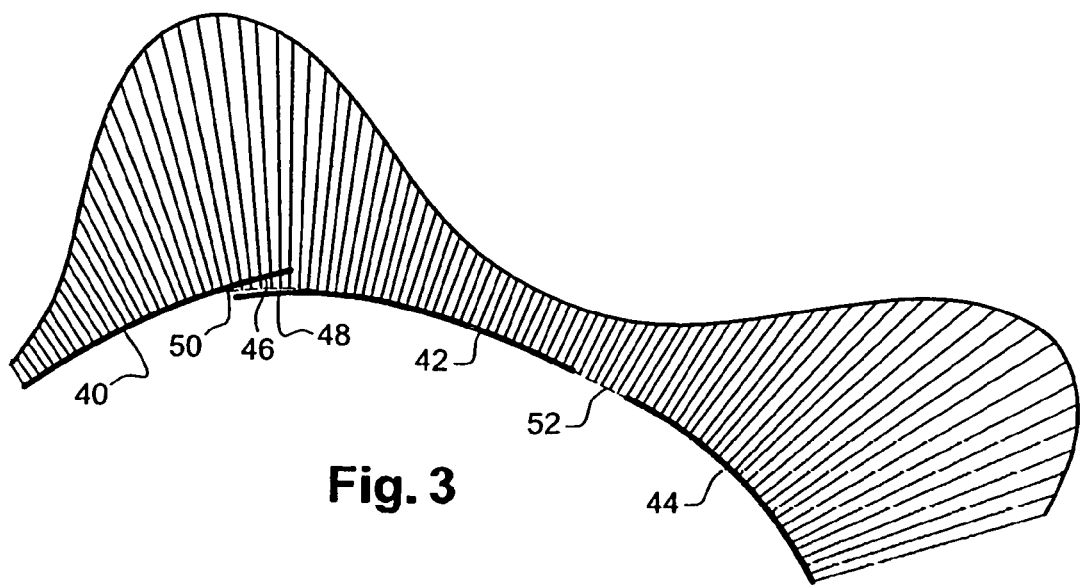
FIG. 3 is a view of a various sets of points together with a polyline based on the sets of points.

Creation of a curve is now described in reference to FIGS. 3-6. FIG. 3 shows a set of points inputted by the user. In the example of FIG. 3, the user has drafted three strokes 40, 42 and 44 with the haptic device, e.g. three strokes of the pencil of the graphics tablet. These strokes are represented in FIG. 3 and result in a set of points. From the user's perspective, the drafting of the three strokes is representative of the intention to create a curve passing substantially through the various strokes. From the design system's perspective, in step 102 of FIG. 5, a set of points is created. The user interface invoked for creating the set of points may any usual or specific user interface, which allows the user to indicate his intention to input a set of points. Each stroke may be handled by the system as a polyline, since the points are naturally ordered along the stroke.

Figure 4:
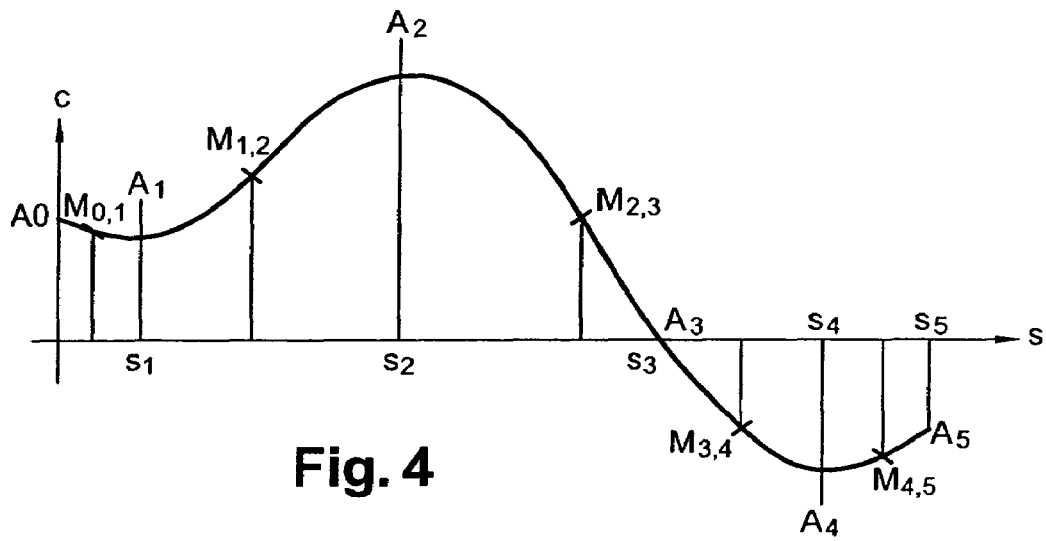
FIG. 4 is a graph of the curvature as a function of the curvilinear abscissa, for a polyline.

Based on the set of points received or created in step 102, the system computes a single resulting polyline in step 104 of FIG. 4. Solutions for carrying out this step are known per se to the person skilled in the art of computer drafting and are not further explained. This step may simply involve dealing with overlap and discontinuities, as explained in reference to the example of FIG. 3. In the example of FIG. 3, the strokes partially overlap; thus, the right-hand end of first stroke 40 is substantially parallel to the left-hand end of second stroke 42. This may be identified, e.g. by assessing that the distance between strokes 40 and 42 is below a given limit. At this time, it is possible to eliminate duplicate points. For instance, in reference to FIG. 3, the points in section 46 of first stroke 40 and section 48 of second stroke 42 could be replaced by the points in dotted line 50. Dotted line 50 is obtained by merging thanks to any known methods (averaging or the like) sections 46 and 48, which overlap. Strokes 42 and 44 do not overlap and will be joined at their ends by any known convenient methods such as blending, to obtain the dotted line 52. This means that the single polyline obtained after step 104 of FIG. 5, in the example of FIG. 3, will be comprised of five sections, that is stroke 40, with the exception of section 46,
dotted line 50,
stroke 42, with the exception of section 48,
dotted line 52;
stroke 44.

Cancelling overlapping sections of strokes may not be necessary, according to the points inputted by the user. More generally, deleting duplicate points in the set or similar treatments may be carried out and may be included, if necessary, in the step 104 of computing a single polyline. One could also use, in step 104, smoothing treatments or other solutions known per se to the person skilled in the art.

It is to be noted that steps 102 and 104 are discussed as separate steps in the example of FIG. 3, since the example deals with three strokes, which with overlap and discontinuities. Actually, steps 102 and 104 may be a single step, e.g. in the example where the user inputs a single stroke, which is handled by the system as a single polyline.

Figure 5:
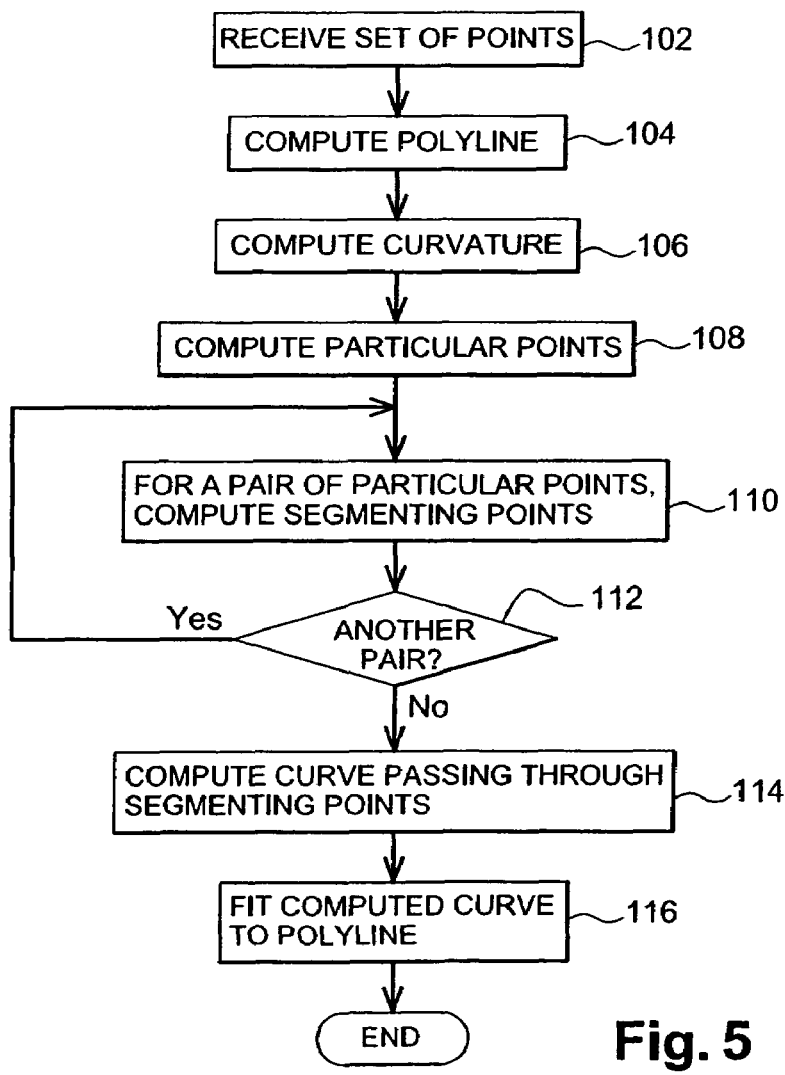
FIG. 5 is a flowchart of the process used for creating a curve according to the invention.

Once the single polyline is computed, the process passes to step 106 in FIG. 5. In step 106, the curvature along the polyline is computed. The curvature is used to determine how to find segmenting points on the polyline, as disclosed in steps 108-112. Thus, the polyline is cut or segmented into portions, each portion extending between two segmenting points. The following rules are preferably applied:

any extremum—maximum or minimum—of curvature should be included in one single portion;
and, optionally, a change of sign of the curvature should be included in one single portion.

In other words, particular points—global or local extrema, points of zero curvature, or the like such as points limiting a constant curvature portion of the polyline—should not be a connecting point, also called segmenting points, between adjacent portions, but should be within a portion. These rules are derived from the fact that fitting curves, as used in the following steps of the process, provide a better fit when the change in curvature is not too important. The steps of the process used for selecting or determining segmenting points on the polyline are explained in reference to FIG. 4, which shows a graph of the curvature C, as a function of the curvilinear abscissa s of the polyline. The graph of FIG. 4 does not correspond to the example of FIG. 3 but shows, for the sake of explanation, various extrema $A_0$ to $A_5$. Specifically, in the graph of FIG. 4, abscissa s=0, $s_2$ and $s_5$ correspond to maxima of curvature, the point with the abscissa $s_2$ being a global maximum. In this graph, the points of abscissa $s_1$ and $s_4$ correspond to minima (or dips) of curvature, the point with the abscissa $s_4$ being a global minimum; the point of abscissa 53 is remarkable in that the curvature is zero.

One preferred solution for segmenting the polyline into portions is to create one portion for each of the particular points in the graph of curvature. This solution may be carried out simply by first computing the particular points in the graph of curvature, as represented in step 108 of FIG. 5. One should understand that this does not require any graphical representation, FIG. 4 being solely provided for the sake of explanation.

Figure 1:
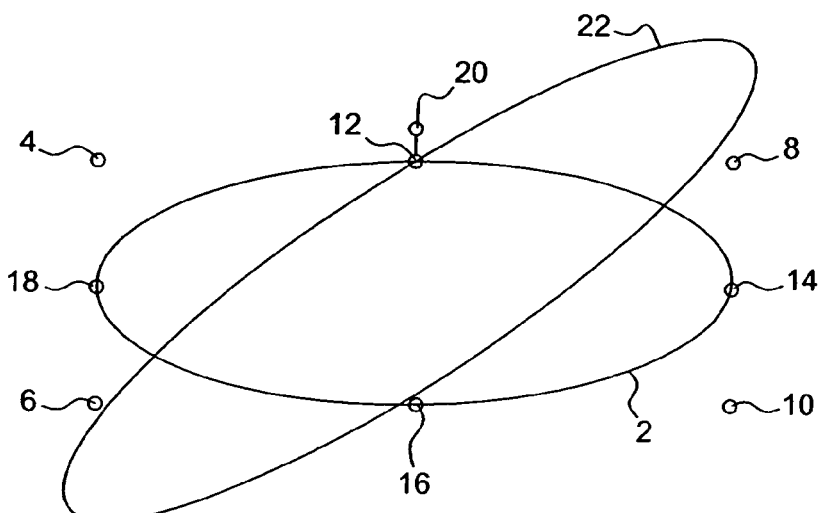
FIG. 1 is an exemplary view of a curve with its control points, in a prior art design system.
Figure 2:
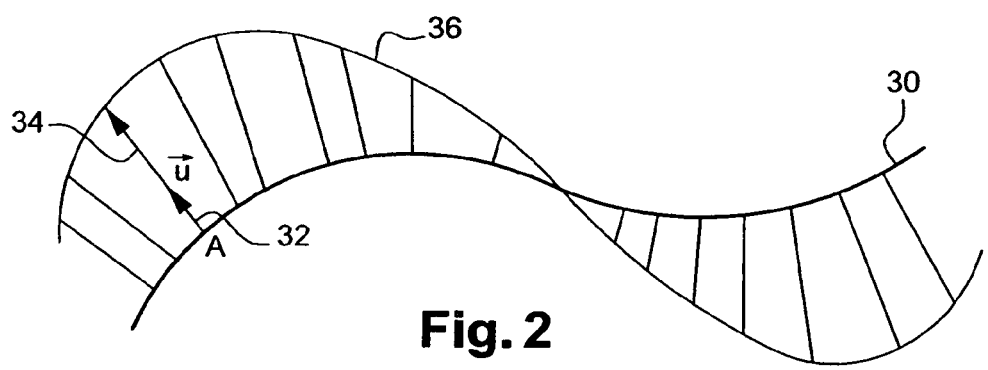
FIG. 2 is a view of a curve with a curvature envelope, as provided in the prior art.

Once the particular points are computed, one selects a segmenting point between two adjacent particular points, as represented in steps 110 and 112 of FIG. 4; in step 110, for a couple of adjacent particular points, a segmenting point is selected; in step 112, the process checks whether more segmenting points are needed or not, if there are couples of particular points, the process passes again to step 110, else it passes to step 114. A first solution for selecting a segmenting point between two adjacent particular points is to select the point of the curve having the curvilinear abscissa in the middle of the two particular points. In the example of points $A_1$ and $A_2$ in the graph of FIG. 1, one could select the point $M_{1,2}$ of the curve having an abscissa s of $(s_1+s_2)/2$. This solution is easy to implement and ensures that the segmentation point is as far as possible from the particular points; this increases the quality of the fitting arc computed in the following steps; one may use a ratio different from 2. A second solution consists in selecting a segmenting point according to the integral of the curvature between the adjacent particular points and the segmenting point. This solution has the advantage of ensuring a better location of the segmenting point, which provides a better fit of the arc in the following steps. Let $A_i$ and $A_{i+1}$ be the particular points between which one segmenting point has to be selected, with $s_i$ and $s_{i+1}$ the respective abscissas of these particular points. For the sake of explanation, it is assumed that $s_i < s_{i+1}$. $A_i$ and $A_{i+1}$ may be two extrema—one minimum and one maximum; or
an extremum—minimum or maximum—and a point where the value of the curvature is zero.

In the first case, assume the curvature is increasing from $A_i$ to $A_{i+1}$ so that $A_i$ is a minimum and $A_{i+1}$ is a maximum. The point $M_{i,\,i+1}$ is selected such that $$k_M \int_{A_i}^{M_{i,i+1}} C(s)\,ds = \int_{M_{i,i+1}}^{A_{i+1}} C(s)\,ds \qquad (1)$$

with $k_M$ a constant, the value of which is chosen for example between 0,1 and 0,5. The lower the value of $k_M$, the nearer the segmenting point is to the maximum; the higher the value of $k_M$, the closer the segmenting point is to the minimum. Equation (1) also applies where $A_i$ is a maximum and $A_{i+1}$ is a minimum, with the proviso that constant $k_M$ is multiplied to the integral having as a boundary the point which is a minimum of curvature.

In the second case, assume the curvature is decreasing from $A_i$ to $A_{i+1}$, and that $A_i$ is a maximum and $A_{i+1}$ a point where the value of curvature is zero. The point $M_{i,\,i+1}$ is selected such that $$k_I \int_{A_i}^{M_{i,i+1}} C(s)\,ds = \int_{M_{i,i+1}}^{A_{i+1}} C(s)\,ds \qquad (2)$$

with $k_1$ a constant, the value of which is chosen between 0,5 and 0,9. The lower the value of $k_1$, the nearer the segmenting point is to the point where the curvature is zero; the higher the value of $k_1$, the closer the segmenting point is to the extremum. Equation (2) also applies where the curvature is increasing from $A_i$ to $A_{i+1}$, or where $A_i$ is a point where the value of curvature is zero; the only difference is that constant $k_1$ is multiplied to the integral having as a boundary the point which is an extremum.

Equations (1) and (2) compare the integral of the curvature along the curve, from the first particular point $A_i$ to the segmenting point $M_{i,i+1}$ and from the segmenting point $M_{i,i+1}$ to the second particular point $A_{i+1}$.

In the previous example, one considered that a segmenting point is added between each pair of adjacent particular points. This is by no means compulsory. For instance, where particular points are too close one to the other, it may be decided not to add a segmenting point between adjacent particular points. This may also be the case where the change in curvature between adjacent points is quite low; In the example of FIG. 5, it is assumed that a segmenting point is added between each pair of adjacent particular points; FIG. 4 thus shows five segmenting points $M_{,1}$, $M_{1,2}$, $M_{2,3}$ and $M_{3,4}$ and $M_{4,5}$.

After step 112, when the process passes to step 114, the polyline formed out of the set of points is split into a number of portions, defined by the segmenting points. One may add to the segmenting points the end points of the curve. In step 114, one computes a curve passing through each of the segmenting points. This may be done, for instance by computing a nurbs, or a Bezier curve passing by the segmenting points; one may use at this step any type of algorithm known per se to the person skilled in the art.

At next step 116, the computed curve is fitted to the polyline determined in step 104, under the constraint that the curve passes through each of the segmenting points. Fitting may be carried out by any algorithm known per se in the art. One may for instance minimize the distance between the computed curve and the polyline, that is minimize the following summation $$\sum_{j \text{in the set}} d(N_j)$$

where $N_j$ are the various points of the polyline and where $d(N_j)$ is the distance between point $N_j$ and the computed curve. This solution has the advantage of increased computing speed. Another solution is to minimize the "energy", that is, minimize the summation $$\sum_{j \text{in the set}} (d(N_j))^2$$

Such "energy" fit has the advantage of an accurate fitting. Steps 114 and 116 are depicted as separate in FIG. 5. However, both steps could be combined in a single step, depending on the type of algorithm used.

The fitting in step 116 provides the resulting curve. The curve is based on the received set of points and on the resulting polyline. The curve is computed (step 114) and fitted (step 116) using the segmenting points; since the segmenting points are "far" from the particular points in the polyline, the curve is fitted with a high degree of freedom in the vicinity of the particular points. This ensures that the curve obtained in the process of FIG. 5 is a good representation of the set of points around the particular points. Tests carried out by the inventors have demonstrated that the particular points actually prove to be the most important points of the curve for the end-user. Thus, the process provides a curve that is particularly well fitted to the set of points and corresponds to the curve that could be obtained by a skilled user in a prior art system.

Figure 6:
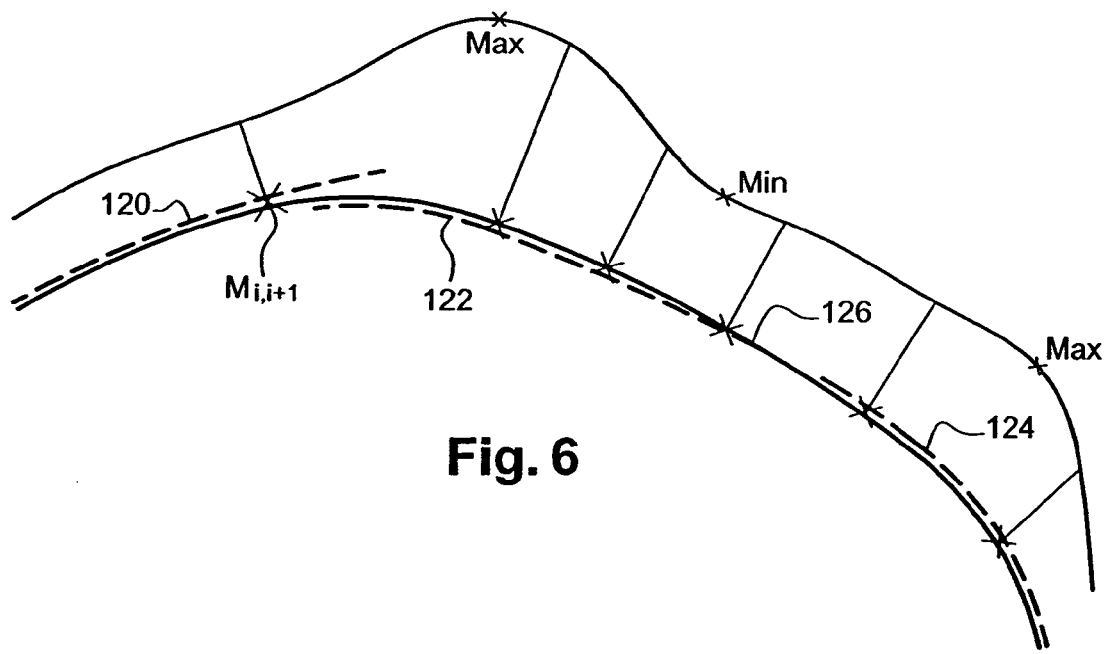
FIG. 6 is a view of sets of points, with a curve created in the process of FIG. 5.

FIG. 6 is a view of a set of points, with a curve created in the process of FIG. 5. In the example of FIG. 6, the set of points is defined by three strokes (in dotted lines) 120, 122 and 124 of the haptic device. The curve is referenced 126. The segmentation points are crossed on the curve. As explained above, segmentation points $M_{i,i+1}$ are "far" from the particular points (Min, Max) in the curve. In the example of FIG. 6, the process uses the following algorithms:

computation of a single polyline from one or more set of points;
selection of segmenting points as disclosed in step 110 of FIG. 5, with $k_M=0,3$ and $k_1=0,6$.
computation of curve passing through segmenting points using an algorithm for a computing a NURBS;
fitting of curve to the set of points using energy minimization.

The curve and the polyline are so fitted that they are superimposed on FIG. 6.

The process is carried out by a computer program written in C++ language. The program uses libraries provided by Dassault Systemes. For strokes of the haptic device comprising around 1000 points, the program is executed in less than 0,1 second on a computer with the following features: Intel Pentium 4 2 GhZ. The resulting curve is stored, using approximately 1 Kbytes of memory for the curve. The set of points need not be stored.

Figure 7:
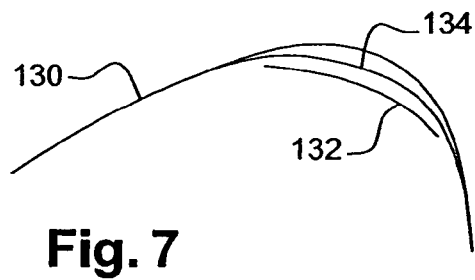
FIG. 7 is a view of a curve, which is to be modified by the user.
Figure 8:
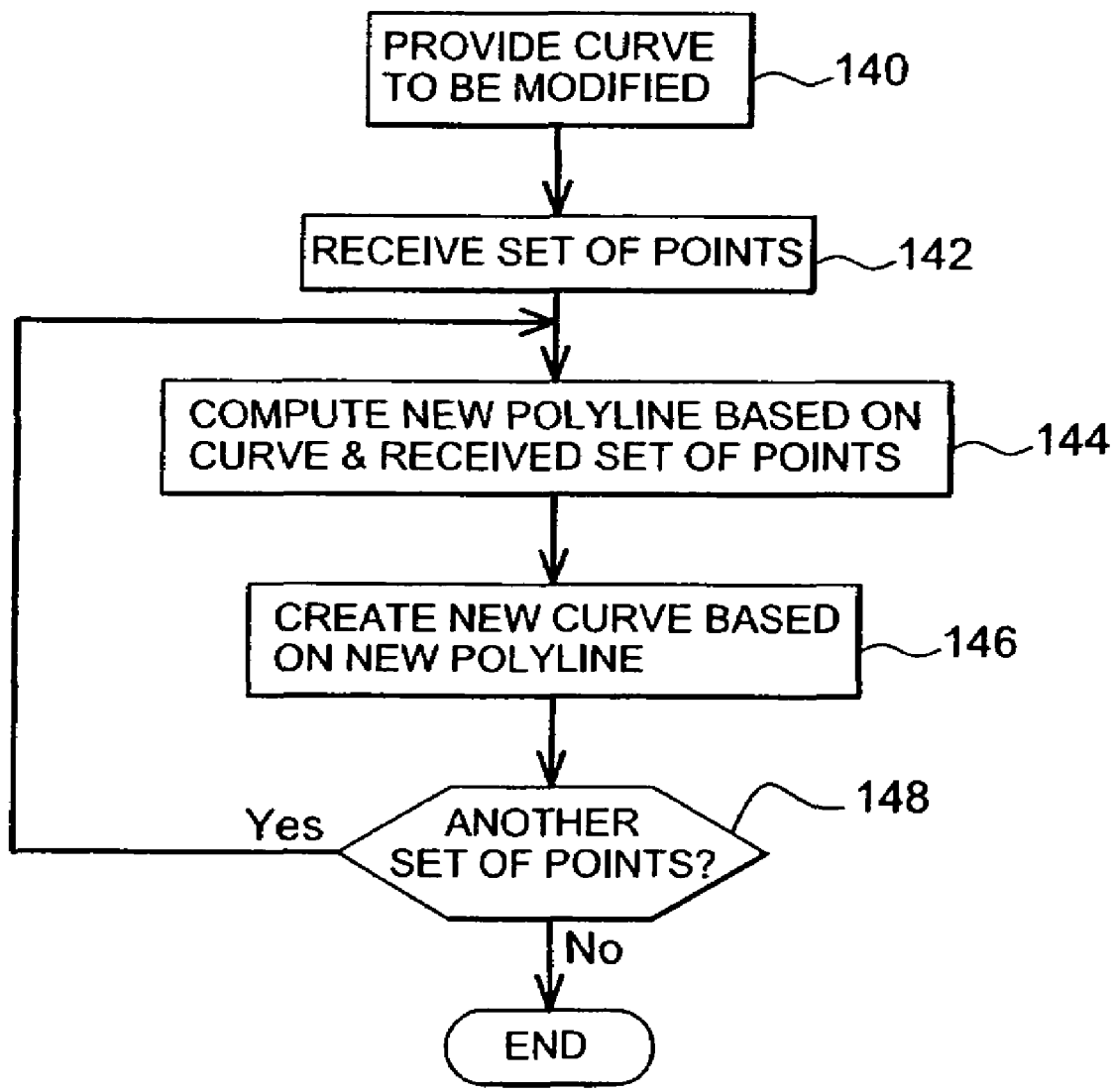
FIG. 8 is a flowchart of the process used for modifying the curve of FIG. 7.

The process of FIGS. 3-6 makes it possible, based on a set of points inputted by the user, to create a curve, without requiring high levels of skill from the user. In reference to FIGS. 7-8 is described a process for amending or modifying an existing curve. Again, the process makes it possible to amend the curve without requiring high levels of skill from the user.

FIG. 7 is a view of a curve 130. It is assumed that the user of the computer-aided design system now wishes to amend curve 130—for any reason relevant to the design he is currently carrying out. In the prior art solution, the user would simply select the curve, select one or more of the control points and change one or more of the control points. As explained above, this requires some skills and some understanding of the operation of the underlying design system.

In the proposed solution, the user simply needs to input more points, using the haptic device. FIG. 7 thus represents an additional stroke 132 of the haptic device, by which the user intends to modify curve 130. In the example, one understands that the summit of the curve is too angled and that the user intends to modify the curve so that it goes closer to the stroke 132. FIG. 7 further shows the resulting curve 134, as obtained in the process of FIG. 8.

FIG. 8 is a flowchart of a process for modifying a curve. The process of FIG. 8 preferably uses the creating process disclosed in reference to FIGS. 3-6. However, one may also use other type of solutions for creating a curve, provided these solutions make it possible to create a curve on the basis of a set of points.

In step 140 of FIG. 8, there is provided a curve—the curve 130 to be modified in the example of FIG. 7.

In step 142, the user creates a set of points, representative of the amendments the user wishes to implement on the curve. As explained in reference to step 102 of FIG. 5, this step may involve a variety of devices for allowing the user to input a set of points. In the same step and as explained above in reference to step 104, one computes a polyline.

In step 144, the process computes a new polyline, based on the curve 130 of step 140 and on polyline computed in step 142. Practically speaking, this is done by finding a polyline associated to the curve 130. As explained below, this polyline may have been stored in the memory of the system at the time of the creation of the curve. The polyline may also be computed anew on the basis of the curve 130, if it is not stored.

In the process, the weight given to the curve may be similar to the weight given to the points inputted by the user. One may of course implement other assumptions, by given more or less importance to the initial curve 130 or to the points inputted by the user. The relative importance of the curve and of the points may also be set by the user himself. One understands that the user may wish that amendments to the curve be more or less rapid, according to the stage in the design process.

For providing the new set of points in step 144, one may use the solutions discussed above in reference to FIG. 3. For instance, one could use any algorithm enabling the merge of the two polylines such as averaging the polylines, blending and the like.

In step 146, the polyline obtained in step 144 is used for creating a new curve. At this step, one may use the process of FIG. 5.

The result of step 146 is a curve, computed on the basis of the new polyline. The curve obtained in step 146 is representative of the amendments required by the user. The curve is amended without requiring from the user any specific knowledge of the drafting algorithm, and without requiring any control point.

The process of FIG. 8 may be carried out on-the-line, any time the user inputs a new set of points. Assume for instance the haptic device used for inputting points is a graphics tablet. A set of points may be comprised of the various points inputted in a given stroke of the pencil on the graphics tablet; in other words, a set of points is comprised of the points on the graphics tablet between the time the user presses the pencil on the tablet and the time the user raises the pencil from the tablet. Once a first set of points is inputted, a polyline is generated and a curve is created—e.g. as described in reference to FIG. 5. Every time a new set of points is inputted, that is for every stroke of the pencil, the previous curve is amended, as described in reference to FIG. 8, thanks to a dynamic re-segmentation of the curve. In other words, after step 146 of FIG. 8, the process awaits for a new set of points, at step 148. When a new set of points in entered by the user, the process passes again to step 144 and computes a new curve. Looping through steps 144, 146 and 148 makes it possible for the user to amend a curve, using a process that looks and feels like the actual drawing process used on a sheet of paper and even better because the previous strokes do not appear on the screen, only the resulting curve being displayed. The process makes it possible for the user to create and amend a curve, without specific skills. The results obtained are similar to the results obtained by a highly skilled user in a prior art system.

In the example provided in reference to FIGS. 7 and 8, the new polyline is computed on the basis of the polyline associated to the existing curve and of the set of points inputted by the user. As seen, said new polyline may be stored together with the curve; in this case, the next time the process is used, one may retrieve the polyline associated with the curve, without having to re-computed a polyline based on the curve. This solution has the advantage of avoiding the need to re-compute a polyline on the basis of the existing curve. The solution is particularly useful when the process is used for computing a curve on the basis of a series of pencil strokes of the user. After each pencil stroke, one may then store a curve and the corresponding polyline. The stored polyline is then used at the time the user inputs a new stroke.

Figure 9:
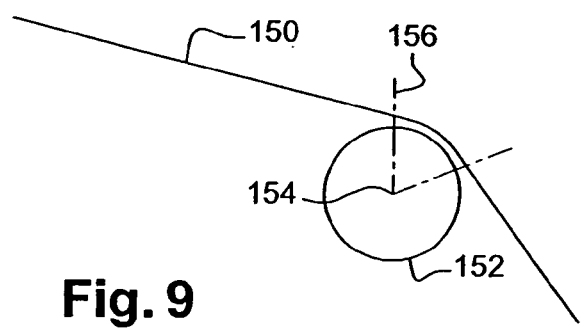
FIG. 9 is a view of a curve, with a template used for modifying the curve.

The process of FIGS. 7 and 8 is described above in reference to the example of a set of points inputted by the user using a haptic device. Set of points may also be inputted by other means. For instance, templates may be used for inputting points, as explained in reference to FIG. 9. This figure shows a curve 150, which is to be amended. The figure further shows a template, in the example a circle 152. This circle 152 may be defined by the user, by selecting a centre 154 and a radius. Template 152 is used as a set of points for modifying the curve 150. One may simply consider the set of points formed by the template; alternatively, the set of points may be formed of only some of the points of the circle. In the example of FIG. 9, if the purpose is to amend the curve so that it conforms to the circle 152 at the apex of the curve, one may simply consider for the set of points the points of the circle which are within the angular sector 156—represented in FIG. 9 in interrupted lines. The angular sector 156 may be selected by the user. Another solution is to define the set of points are those points in the template which are within a predetermined distance from the curve to be amended; if this solution is used, the predetermined distance may be fixed or may be selected by the user. In all instances, the use of templates makes it possible for the user to amend a curve, so that it conforms to a given shape or to a previously stored shape. The template may be a given shape—a circle, a straight line or any other type of parametric shape specified by the user. The template may also be a previously stored shape, such as the shape of a previously designed curve, stored by the user or be offered by the design system.

The invention is not limited to the examples provided in the detailed description. One may allow the user to interact with the process; for instance, the user may himself define the beginning and the end of the entering for the set of points. The computer-aided design system may allow the user to select between various types of design methods, such as the one of FIG. 5 or the one of FIG. 8 with a loop through steps 144-148. One may combine the solutions disclosed above with prior art solutions. For instance, the user may be allowed to use one or more control points; thus, when a satisfactory section of curve is obtained, the user may segment the curve or fix some points in the curve, before amending the rest of the curve. Using templates for inputting points is discussed in reference to FIGS. 7-9; this solution also applies to the process of FIGS. 3-6.

The invention claimed is:

1. A computer-implemented process for creating a curve, comprising the steps of:
    receiving a set of points and computing a polyline based on the received set of points;
    computing curvature along the polyline;
    determining particular points on the polyline, the particular points comprising extrema of curvature;
    determining at least one segmenting point on the polyline apart from the particular points;
    computing a curve passing through the segmenting points; and
    fitting said curve to the polyline,
    wherein said steps are carried out with a computer processor.

2. The process of claim 1, wherein the particular points comprise points where the value of the curvature is zero.

3. A computer-implemented process for creating a curve, comprising the steps of:
    receiving a set of points and computing a polyline based on the received set of points;
    computing curvature along the polyline;
    determining particular points on the polyline, the particular points comprising extrema of curvature and points where the value of the curvature is zero;
    determining segmenting points on the polyline apart from the particular points;
    computing a curve passing through the segmenting points; and
    fitting said curve to the polyline,
    wherein said steps are carried out with a computer processor.

4. The process of one of claims 1 or 3, wherein the particular points further comprise points limiting a portion of the polyline where the value of the curvature is constant.

5. The process of one of claims 1 or 3, wherein the step of determining comprises selecting one segmenting point between two adjacent particular points.

6. The process of claim 5, wherein the segmenting point is selected according to the relative value of
the integral of the curvature along the polyline from one of said two adjacent particular points to the segmenting point and
the integral of the curvature along the polyline from the segmenting point to the other one of said two adjacent particular points.

7. The process of claim 6, wherein one of the two adjacent particular points is a point where the value of curvature is zero, and wherein the segmenting point is selected so that
the product of a first predetermined constant by the integral of the curvature along the curve from the other of said two adjacent particular points to the segmenting point equals
the integral of the curvature along the curve from the segmenting point to the point where the value of curvature is zero.

8. The process of claim 7, wherein the value of said first predetermined constant is between 0.5 and 0.9.

9. The process of claim 6, wherein the two adjacent particular points are a minimum and a maximum of curvature and wherein the segmenting point is selected so that
the product of a second predetermined constant by the integral of the curvature along the curve from the minimum of curvature to the segmenting point equals
the integral of the curvature along the curve from the segmenting point to maximum of curvature.

10. The process of claim 9, wherein the value of said second predetermined constant is between 0.1 and 0.5.

11. The process of one of claims 1 or 3, wherein the step of fitting comprises minimizing the energy of the curve.

12. The process of one of claims 1 or 3 further comprising a computer implemented process for amending a curve, comprising the steps of:
providing a curve;
receiving a set of points and computing a polyline;
computing a new polyline based on the curve and on the computed polyline; and
creating a curve based on the new polyline, according to the process of one of claims 1 or 3.

13. The process of claim 12, wherein the step of computing a new polyline comprises
retrieving a polyline associated to the curve; and
merging the retrieved polyline and the computed polyline.

14. The process of claim 13, wherein the step of retrieving a polyline associated to the curve comprises retrieving a stored polyline.

15. The process of claim 13, wherein the step of retrieving a polyline associated to the curve comprises computing a polyline on the basis of the curve.

16. The process of claim 12, wherein the step of receiving a set of points comprises receiving a template.

17. The process of one of claims 1 or 3 further comprising the steps of:
detecting a first stroke inputted by a user on a haptic device;
creating a curve based on a first set of points corresponding to said first stroke, according to the process of one of claims 1 or 3;
detecting a second stroke inputted by the user on the haptic device;
computing a polyline based on the created curve and on a second set of points corresponding to said second stroke; and
creating a curve based on the polyline, according to the process of one of claims 1 or 3.

18. The process of claim 17, wherein the steps of detecting, computing and creating are repeated for each new stroke inputted by the user on the haptic device.

19. A data storage medium comprising storage instructions for creating a curve, comprising
a routine for receiving a set of points and computing a polyline based on the received set of points;
a routine for computing curvature along the polyline;
a routine for determining particular points on the polyline, the particular points comprising extrema of curvature;
a routine for determining at least one segmenting point on the polyline apart from the particular points;
a routine for computing a curve passing through the segmenting points; and
a routine for fitting said curve to the polyline.

20. A computer-readable data storage medium comprising storage instructions for creating a curve, that when executed by a computer cause the computer to:
receive a set of points and computing a polyline based on the received set of points;
compute curvature along the polyline;
determine particular points on the polyline, the particular points comprising extrema of curvature and points where the value of the curvature is zero;
determine segmenting points on the polyline apart from the particular points;
compute a curve passing through the segmenting points; and
fit said curve to the polyline.

21. The computer-readable data storage medium of one of claims 19 or 20, further comprising data storage instructions for amending a curve, that when executed by a computer cause the computer to:
provide a curve;
receive a set of points and computing a polyline;
compute a new polyline based on the curve and on the computed polyline; and
create a curve based on the new polyline, using the data storage medium instructions of one of claims 19 or 20.

22. The computer-readable data storage medium of one of claims 19 or 20, further comprising storage instructions for creating a curve, that when executed by a computer cause the computer to:
a routine for detecting a first stroke inputted by a user on a haptic device;
a routine for creating a curve based on a first set of points corresponding to said first stroke, using the data storage medium instructions of one of claims 19 or 20;
a routine for detecting a second stroke inputted by the user on the haptic device;
a routine for computing a polyline based on the created curve and on a second set of points corresponding to said second stroke; and
a routine for creating a curve based on the polyline, using the data storage medium instructions of one of claims 19 or 20.

23. A computer implemented process for amending a curve, comprising the steps of
providing a curve;
receiving a set of points and computing a polyline;
computing a new polyline based on the curve and on the computed polyline; and creating a curve based on the new polyline, comprising the steps of:
computing curvature along the new polyline;
determining particular points on the new polyline, the particular points comprising extrema of curvature;
determining at least one segmenting point on the new polyline apart from the particular points, comprising selecting one segmenting point between two adjacent particular points, wherein the segmenting point is selected according to the relative value of:
the integral of the curvature along the new polyline from one of said two adjacent particular points to the segmenting point; and
the integral of the curvature along the new polyline from the segmenting point to the other one of said two adjacent particular points, wherein one of the two adjacent particular points is a point where the value of curvature is zero, and wherein the segmenting point is selected so that:
the product of a first predetermined constant, with a value between 0.5 and 0.9, by the integral of the curvature along the curve from the other of said two adjacent particular points to the segmenting point equals
the integral of the curvature along the curve from the segmenting point to the point where the value of curvature is zero;
computing a curve passing through the segmenting points; and
fitting said curve to the new polyline comprising minimizing the energy of the curve, wherein said steps are carried out with a computer processor.

* * * * *